US012713214B2

(12) United States Patent
Sun

(10) Patent No.: US 12,713,214 B2
(45) Date of Patent: Aug. 18, 2026

(54) CALL CONTROL METHOD, APPARATUS AND SYSTEM, ELECTRONIC DEVICE AND STORAGE MEDIUM

(71) Applicant: ShangHai Qwik Smart Technology Co., Ltd., Shanghai (CN)

(72) Inventor: Changquan Sun, Shanghai (CN)

(73) Assignee: ShangHai Qwik Smart Technology Co., Ltd., Shanghai (CN)

( * ) Notice: Subject to any disclaimer, the term of this patent is extended or adjusted under 35 U.S.C. 154(b) by 418 days.

(21) Appl. No.: 18/397,709

(22) Filed: Dec. 27, 2023

(65) Prior Publication Data

US 2024/0129696 A1 Apr. 18, 2024

Related U.S. Application Data

(63) Continuation of application No. PCT/CN2021/124750, filed on Oct. 19, 2021.

(30) Foreign Application Priority Data

Jun. 30, 2021 (CN) ......................... 202110733547.2

(51) Int. Cl.
*H04W 4/48* (2018.01)
*H04M 1/72412* (2021.01)
*H04M 1/72484* (2021.01)

(52) U.S. Cl.
CPC ......... *H04W 4/48* (2018.02); *H04M 1/72412* (2021.01); *H04M 1/72484* (2021.01)

(58) Field of Classification Search
CPC .. H04M 1/663; H04M 3/436; H04M 1/72412; H04M 1/72484; H04M 2250/02;
(Continued)

(56) References Cited

U.S. PATENT DOCUMENTS 9,900,315 B2 * 2/2018 Yusuf ...................... H04L 63/10
9,948,758 B1 4/2018 Choi et al.
(Continued)

FOREIGN PATENT DOCUMENTS

CN 105227739 A 1/2016
CN 106515612 A 3/2017
(Continued)

OTHER PUBLICATIONS

The World Intellectual Property Organization (WIPO) International Search Report for PCT/CN2021/124750 Feb. 14, 2022 5 Pages (Including English Translation).

*Primary Examiner* — Cindy Trandai
(74) *Attorney, Agent, or Firm* — ANOVA LAW GROUP, PLLC

(57) ABSTRACT

A call control method includes: establishing a Bluetooth connection with a mobile terminal; obtaining call information of the mobile terminal; determining whether a number corresponding to a call event is an empty number or a number of the mobile terminal, the call event being an event corresponding to the call information; in response to the number corresponding to the call event being neither an empty number nor the number of the mobile terminal, determining that the call event is a phone call event, and in response to the number corresponding to the call event being either an empty number or the number of the mobile terminal, determining that the call event is not a phone call event; and loading a call interface only when it is determined that the call event is a phone call event.

20 Claims, 5 Drawing Sheets

(58) Field of Classification Search
CPC .. H04M 1/6091; H04M 1/57; H04M 1/72469; H04M 1/72403; H04M 1/72406; H04W 4/48; H04W 4/16; H04W 4/80; Y02D 30/70
See application file for complete search history.

(56) References Cited

U.S. PATENT DOCUMENTS

| | | | | |
|---|---|---|---|---|
| 12,149,920 | B2 * | 11/2024 | Wang | H04W 36/00224 |
| 2013/0057638 | A1 | 3/2013 | Tamkivi | |
| 2021/0051232 | A1 * | 2/2021 | Ly | H04M 3/527 |
| 2021/0234951 | A1 * | 7/2021 | Bai | H04L 1/02 |
| 2021/0297520 | A1 * | 9/2021 | Takada | H04M 1/6091 |
| 2021/0329117 | A1 * | 10/2021 | Yang | H04W 12/12 |
| 2021/0400130 | A1 * | 12/2021 | Ridgill, II | H04L 9/3297 |
| 2022/0086269 | A1 * | 3/2022 | Gao | H04M 1/663 |
| 2022/0340173 | A1 * | 10/2022 | Brown | G08G 1/096716 |
| 2023/0049548 | A1 * | 2/2023 | Zhang | H04M 1/72442 |

FOREIGN PATENT DOCUMENTS

| | | | |
|---|---|---|---|
| CN | 110662187 | A | 1/2020 |
| CN | 111083683 | A | 4/2020 |
| CN | 111132088 | A | 5/2020 |
| CN | 111328061 | A | 6/2020 |

* cited by examiner

CALL CONTROL METHOD, APPARATUS AND SYSTEM, ELECTRONIC DEVICE AND STORAGE MEDIUM

CROSS-REFERENCE TO RELATED APPLICATION

This application is a national stage application of International Application No. PCT/CN2021/124750, filed on Oct. 19, 2021, which claims priority to Chinese Patent Application No. 202110733547.2, filed with the China National Intellectual Property Administration (CNIPA) on Jun. 30, 2021, the entire contents of all of which are incorporated herein by reference.

TECHNICAL FIELD

The present disclosure relates to the technical field of computer technologies and, more particularly, to a call control method, apparatus, and system, an electronic device, and a storage medium.

BACKGROUND

Bluetooth in-vehicle phone is a system specially designed for driving safety and comfort, and vehicle driver and passengers can communicate with the outside world without cables or phone jacks. For example, InCallService is a Bluetooth phone system providing a bridge between a user interface (UI) and a telecom network. Various call updates and operations may be completed through InCallService. When a phone call is made, low-level functions of the system process the phone call as a Bluetooth phone call, and relay relevant call information to an upper-level application program through InCallService, so as to load a call interface on a display screen of a vehicle terminal or a vehicle infotainment system.

However, in some versions of Android system, when receiving a voice call from an instant messaging application or playing a voice message from the instant messaging application, the low-level functions of the system will also treat the voice call or voice message as a normal Bluetooth phone call, and through InCallService, the relevant call information will be relayed to the upper-level application program. Subsequently, the upper-level application program loads the same call interface as for a Bluetooth phone call, which is likely to cause user misunderstanding. A user cannot distinguish whether a current call event is a phone call or a message from an instant messaging application through the call interface, thereby causing user frustration.

SUMMARY

One aspect of the present disclosure provides a call control method. The method includes: establishing Bluetooth connection with a mobile terminal; obtaining call information of the mobile terminal; determining whether a number corresponding to a call event is an empty number or a number of the mobile terminal, the call event being an event corresponding to the call information; in response to the number corresponding to the call event being neither an empty number nor the number of the mobile terminal, determining that the call event is a phone call event, and in response to the number corresponding to the call event being either an empty number or the number of the mobile terminal, determining that the call event is not a phone call event; and loading a call interface only when it is determined that the call event is a phone call event.

Another aspect of the present disclosure provides an electronic device. The electronic device includes a memory storing computer instructions and a processor coupled to the memory. When being executed by the processor, the computer instructions cause the processor to: establish a Bluetooth connection with a mobile terminal; obtain call information of the mobile terminal; determine whether a number corresponding to a call event is an empty number or a number of the mobile terminal, the call event being an event corresponding to the call information; in response to the number corresponding to the call event being neither an empty number nor the number of the mobile terminal, determine that the call event is a phone call event, and in response to the number corresponding to the call event being either an empty number or the number of the mobile terminal, determine that the call event is not a phone call event; and load a call interface only when it is determined that the call event is a phone call event.

Another aspect of the present disclosure provides a non-volatile computer-readable storage medium storing computer instructions. When being executed by a processor, the computer instructions cause the processor to perform: establishing a Bluetooth connection with a mobile terminal; obtaining call information of the mobile terminal; determining whether a number corresponding to a call event is an empty number or a number of the mobile terminal, the call event being an event corresponding to the call information; in response to the number corresponding to the call event being neither an empty number nor the number of the mobile terminal, determining that the call event is a phone call event, and in response to the number corresponding to the call event being either an empty number or the number of the mobile terminal, determining that the call event is not a phone call event; and loading a call interface only when it is determined that the call event is a phone call event.

DETAILED DESCRIPTION OF THE EMBODIMENTS

The embodiments of the present disclosure will be illustrated by various examples below, and those skilled in the art can easily understand other advantages and effects of the present disclosure from the description disclosed in the specification. Although the description of the disclosure will be presented in conjunction with preferred embodiments, it is not intended that the features of the disclosure be limited to these embodiments only. On the contrary, the objective of describing the disclosure in conjunction with the various embodiments is to cover other options or modifications that may be extended based on the claims of the present disclosure. The following description contains numerous details to provide a thorough understanding of the present disclosure. The disclosure may also be practiced without certain details. In addition, certain details may be omitted from the description to focus on key aspects of the present disclosure.

In the description of the present disclosure, it should be noted that unless otherwise specified and limited, the terms “installation”, “connection” and “connection” should be understood in a broad sense. For example, it may be a fixed connection, a detachable connection, or an integral connection. It may be a mechanical connection or an electrical connection. It may be a direct connection or an indirect connection through an intermediary, and it may be an internal connection between two components. Those of ordinary skill in the art can understand specific meanings of the above terms in the present disclosure in specific situations.

In addition, the terms “up”, “down”, “left”, “right”, “top”, “bottom”, “horizontal”, and “vertical” used in the following description should be understood as orientation shown in the accompanying drawings. The relative terms are used for convenience of description only, and do not imply that a device described therein must be manufactured or operated in a specific orientation, and thus should not be construed as limiting the present disclosure.

It should be understood that although the terms “first”, “second”, “third”, etc. may be used herein to describe various components, regions, layers and/or sections, these components, regions, layers and/or sections should not be limited by these terms, and these terms are merely used to distinguish different components, regions, layers and/or sections. Thus, a first component, region, layer and/or section discussed below could also be described as a second component, region, layer and/or section without departing from the scope of the embodiments of the present disclosure.

Embodiment One

Figure 1:
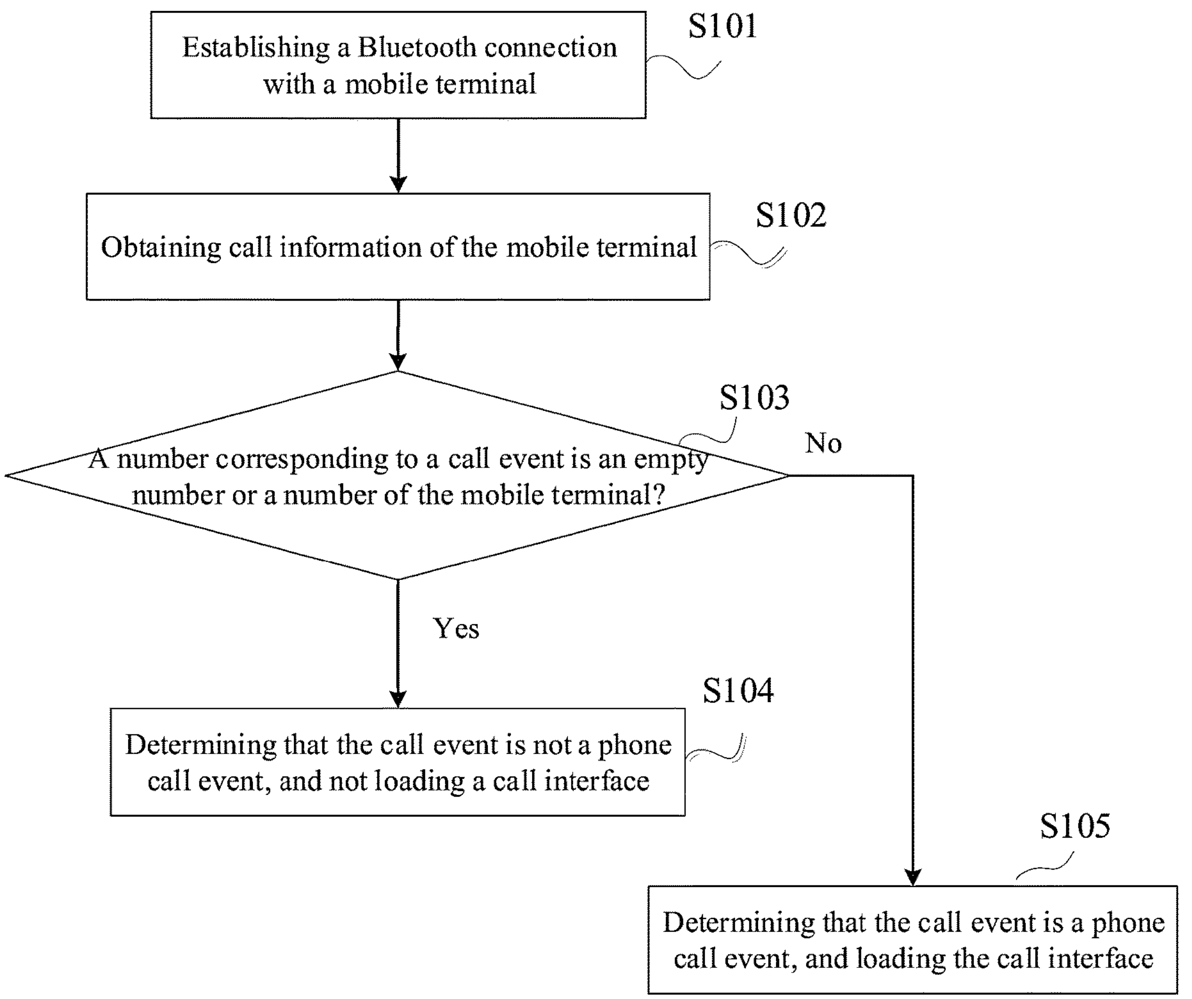
FIG. 1 is a flowchart of an exemplary call control method according to some embodiments of the present disclosure.

FIG. 1 is a flowchart of an exemplary call control method according to some embodiments of the present disclosure. The call control method may be executed by a call control apparatus. The call control apparatus may be implemented by software and/or hardware, and may be a part or all of an electronic device.

The following describes the call control method provided by the embodiment with the electronic device as an executor. As shown in FIG. 1, the call control method includes the following processes.

At S101, a Bluetooth connection is established with a mobile terminal.

In some embodiments, the electronic device may be a vehicle terminal or a smart speaker system. The vehicle terminal may also be called an in-vehicle information system. The vehicle terminal is installed in vehicles as an in-vehicle infotainment system capable of communicating between a user and the vehicle, and between the vehicle and the outside world. The mobile terminal may be a mobile phone, a wearable device, a personal digital assistant (PDA), and a tablet computer, etc.

Figure 2:
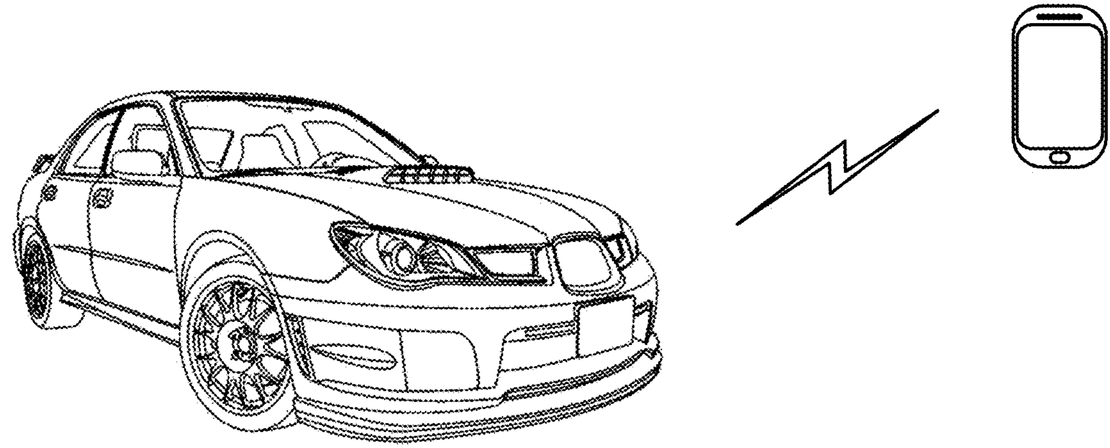
FIG. 2 is an application scene diagram of an exemplary call control method according to some embodiments of the present disclosure.

FIG. 2 is an application scene diagram of an exemplary call control method according to some embodiments of the present disclosure. As shown in FIG. 2, the electronic device is a vehicle terminal installed in a vehicle, and the mobile terminal is a mobile phone. Bluetooth function of both the vehicle terminal and the mobile phone are turned on. A Bluetooth connection has been established between the vehicle terminal and the mobile terminal.

At S102, call information is obtained from the mobile terminal.

In some embodiments, the call information is obtained from the mobile terminal using a Bluetooth protocol. For example, the call information may be obtained using advanced audio distribution profile (A2DP) protocol.

The call information may include the call information of phone calls as well as the call information of an instant messaging application program.

At S103, whether a phone number corresponding to a call event is an empty number or a number of the mobile terminal is determined. If the phone number corresponding to the call event is an empty number, S104 is executed. Otherwise, S105 is executed.

The call event is an event corresponding to the call information. For example, the call event may include a phone call event, a voice call event of an instant messaging application program, a video call event of an instant messaging application program, an audio playback event of an instant messaging application program, and a video playback event of an instant messaging application program.

The number of the mobile terminal refers to a phone number associated with a subscriber identity module (SIM) installed in the mobile terminal. The number may be obtained through the Bluetooth connection established between the electronic device and the mobile terminal and may be stored locally in the electronic device.

For example, the phone number corresponding to the call event is obtained before determining whether the phone number is an empty number or a number of the mobile terminal.

At S104, it is determined that the call event is not a phone call event, and a call interface is not loaded.

If the phone number corresponding to the call event is an empty number or the number of the mobile terminal, it is determined that the call event is not a phone call event. To prevent the user from mistaking the call event for a phone call event, the call interface is not loaded on the display screen of the electronic device. In this case, the call event may be a voice/video call event of an instant messaging application program or an audio/video playback event of an instant messaging application program.

For example, at S104, if it is determined that the call event is not a phone call event, the call event is intercepted. For example, the call event may be intercepted in a process of being transmitted to the upper-level application program. As such, not only processing resource of the electronic device is less occupied, but also the user is prevented from being unable to accurately identify the call event through the call interface, thereby eliminating the user’s frustration.

At S105, it is determined that the call event is a phone call event, and the call interface is loaded.

If the phone number corresponding to the call event is neither an empty number nor the number of the mobile terminal, it is determined that call event is a phone call event. At this time, the call interface is loaded on the display screen of the electronic device, such that the user can determine from the display screen of the electronic device that a current service of the mobile terminal is a telephone service. In this case, the call event may be an event of making a phone call or an event of receiving a phone call.

For example, at S105, if it is determined that the call event is a phone call event, the call event is transmitted to the upper-level application program, and the call interface corresponding to the call event is loaded. If the call event is an event of making a phone call, the call interface for making a phone call will be loaded. If the call event is an event of receiving a phone call, the call interface for receiving a phone call will be loaded. Understandably, during a call process of the call event, the call interface for call in progress is loaded. As such, loading the call interface corresponding to a specific event type facilitates the user to quickly identify a correct type of the call event, thereby making it easier for the user to perform the corresponding operations.

Figure 3A:
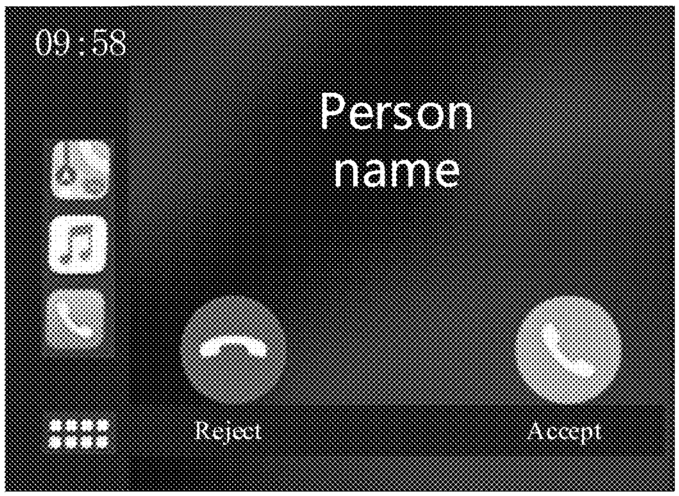
FIG. 3A is a schematic diagram showing a call interface on a vehicle terminal according to some embodiments of the present disclosure.

FIG. 3A is a schematic diagram showing a call interface on a vehicle terminal according to some embodiments of the present disclosure. In some embodiments, the call event of the mobile phone connected to the vehicle terminal is an event of receiving a phone call. The call interface for receiving a phone call loaded on the vehicle terminal is shown in FIG. 3A. Through the call interface for receiving a phone call, the user may recognize that a current call scene is an incoming phone call.

In this case, the call interface is only loaded when it is determined that the call event is a phone call event. The user is facilitated to accurately recognize the current call scene through the call interface of the electronic device. For example, the call interface can be used to directly determine that the current call event is a phone call event, and is not any other call event, such as a voice call event of an instant messaging application program, and an audio playback event of an instant messaging application program, thereby improving user's experience of using the electronic device to interact with the mobile terminal.

Figure 3B:
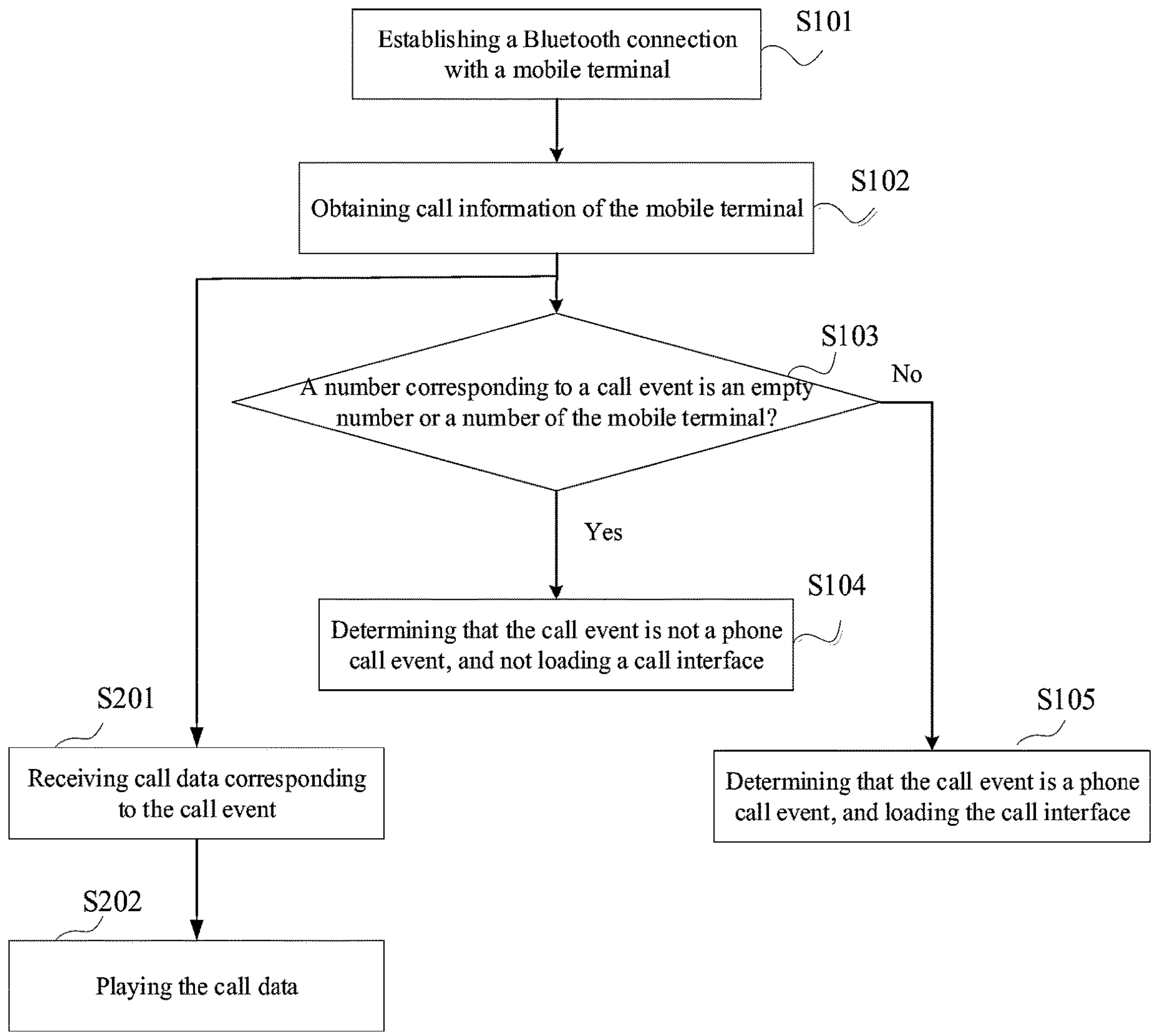
FIG. 3B is a flowchart of another exemplary call control method according to some embodiments of the present disclosure.

FIG. 3B is a flowchart of another exemplary call control method according to some embodiments of the present disclosure. As shown in FIG. 3B, after S102, the call control method may further include the following processes.

At S201, call data corresponding to the call event is received.

Specifically, the call data may be received through a Bluetooth protocol. For example, the call data may be received through hands-free profile (HFP) protocol.

At S202, the call data is played.

Specifically, audio content in the call data may be played by an audio playback apparatus in the electronic device, e.g., a stereo speaker system.

In the embodiment of the present disclosure, the electronic device may receive the call data corresponding to the call event, and play the audio content in the call data. Specifically, the call data of an incoming calling party, the call data of an outgoing called party, the audio call data of a calling party of a voice/video call, and the audio data in a voice/video message, etc. may be played. For example, the electronic device is a vehicle terminal. The vehicle terminal plays the call data corresponding to the call event to improve driving safety of the user and comfort of driving the vehicle.

Figure 3C:
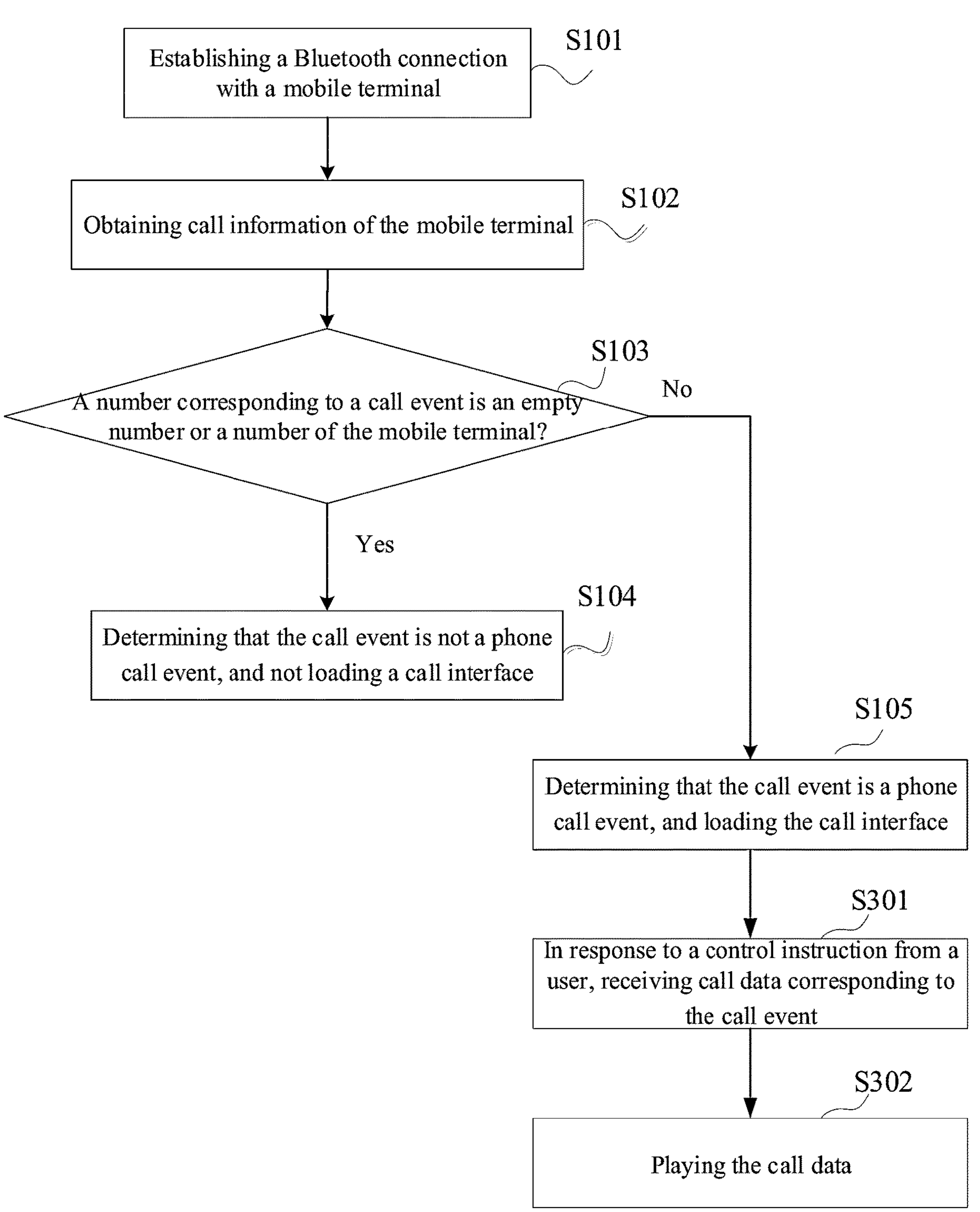
FIG. 3C is a flowchart of another exemplary call control method according to some embodiments of the present disclosure.

FIG. 3C is a flowchart of another exemplary call control method according to some embodiments of the present disclosure. As shown in FIG. 3C, after S105, the call control method may further include the following processes.

At S301, in response to a control instruction from the user, the call data corresponding to the call event is received. Specifically, the call data is received through Bluetooth protocol. For example, the call data is received through the HFP protocol.

At S302, the call data is played.

Specifically, audio content in the call data may be played by the audio playback apparatus in the electronic device, e.g., the stereo speaker system.

In the embodiment of the present disclosure, after the electronic device load the call interface, the electronic device determines whether to receive the call data corresponding to the call event based on the control instruction from the user, and plays the audio content in the call data. For example, the control instruction from the user is a receiving instruction. IN response to the receiving instruction from the user, the electronic device receives the call data corresponding to the call event, and plays the call data. If the control instruction from the user is a rejection instruction, the call data corresponding to the call event is not received. Specifically, the call data of an incoming calling party, the call data of an outgoing called party, the audio call data of a calling party of a voice/video call, and the audio data in a voice/video message, etc. may be played. For example, the electronic device is a vehicle terminal. The vehicle terminal plays the call data corresponding to the call event to improve driving safety of the user and comfort of driving the vehicle. Thus, the user experience is improved, and the user's need is fully respected.

The present disclosure also provides a call control apparatus. The call control apparatus includes a processor, a memory, a communication module, and a display device. The communication module establishes Bluetooth connection with the mobile terminal. The processor communicates with the communication module and the display device.

The memory is configured to store instructions. When the instructions are executed by the processor, the instructions cause the processor to perform: obtaining call information of a mobile terminal; determining whether a number corresponding to a call event is an empty number or a number of the mobile terminal, the call event being an event corresponding to the call information; in response to the number corresponding to the call event being neither an empty number nor the number of the mobile terminal, determining that the call event is a phone call event; in response to the number corresponding to the call event being either an empty number or the number of the mobile terminal, determining that the call event is not a phone call event; in response to determining that the call event is a phone call event, loading a call interface on the display device.

It should be noted that the call control apparatus may be a separate chip, a chip module, or an electronic device, or may be a separate chip or a chip module integrated in an electronic device.

Embodiment Two

Figure 4:
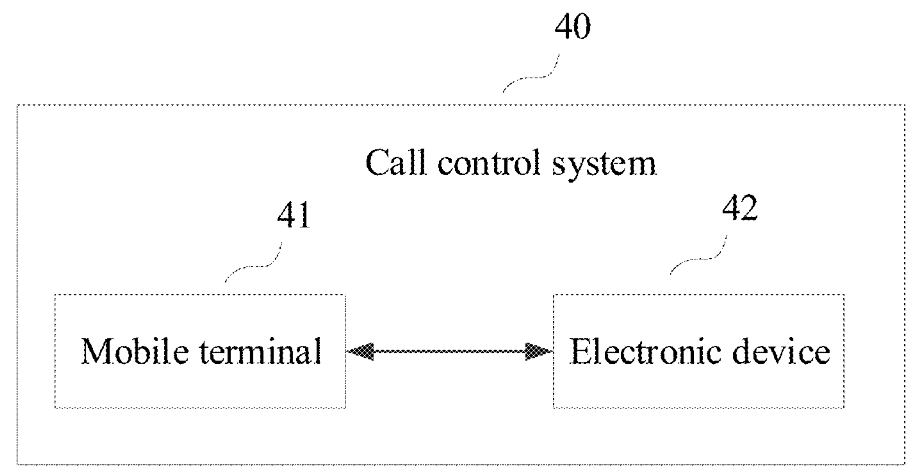
FIG. 4 is a structural block diagram of an exemplary call control system according to some embodiments of the present disclosure.

The present disclosure also provides a call control system. FIG. 4 is a structural block diagram of an exemplary call control system according to some embodiments of the present disclosure. As shown in FIG. 4, the call control system 40 includes a mobile terminal 41 and an electronic device 42. The mobile terminal 41 may be a mobile phone, a wearable device, a PDA, or a tablet computer, etc. The electronic device 42 may be a vehicle terminal or a smart speaker system, etc. The vehicle terminal may also be called an in-vehicle information system, that is, an in-vehicle infotainment product installed in the vehicle, capable of information communication between the user and the vehicle or between the vehicle and the outside world.

Bluetooth function of the mobile terminal 41 and the electronic device 42 are both turned on, and Bluetooth connection is established between the mobile terminal 41 and the electronic device 42.

The mobile terminal 41 transmits call information to the electronic device 42. Specifically, the call information is sent to the electronic device 42 through Bluetooth protocol, e.g., through A2DP protocol.

The call information may include phone call information or may include instant messaging application program call information.

The electronic device 42 determines whether the number corresponding to the call event is an empty number or a number of the mobile terminal 41. In response to the number corresponding to the call event being neither an empty number nor the number of the mobile terminal 41, it is determined that the call event is a phone call event. In response to the number corresponding to the call event being either an empty number or the number of the mobile terminal 41, it is determined that the call event is not a phone call event. When it is determined that the call event is a phone call event, the call interface is loaded.

The call event is an event corresponding to the call information. Specifically, the call event may be a phone call event, a voice call event of an instant messaging application program, a video call event of an instant messaging application program, an audio playback event of an instant messaging application program, or a video playback event of an instant messaging application program.

The number of the mobile terminal refers to a phone number associated with SIM card installed in the mobile terminal. The number of the mobile terminal may be obtained through Bluetooth connection established between the electronic device and the mobile terminal and may be stored locally in the electronic device.

In the embodiment of the present disclosure, the number corresponding to the call event is obtained. Whether the number is an empty number or the number of the mobile terminal is determined. If the number corresponding to the call event is an empty number or the number of the mobile terminal, it is determined that the call event is not a phone call event. To prevent the user from mistaking the call event for a phone call event, the call interface is not loaded on the display device of the electronic device. If the number corresponding to the call event is neither an empty number nor the number of the mobile terminal, it is determined that the call event is a phone call event, and the call interface is loaded on the display device of the electronic device. Thus, the user can determine from the call interface on the electronic device that the current service of the mobile terminal is a phone service.

In the embodiment of the present disclosure, the call interface is only loaded when it is determined that the call event is a phone call event, which facilitates the user to correctly recognize the current call scene through the call interface on the electronic device. Specifically, the user can determine directly from the call interface that the current call event is a phone call event, and is not other call event such as a voice call event of an instant messaging application program or an audio playback event of an instant messaging application program. Thus, the user experience of using the electronic device to interact with the mobile terminal is improved.

In the embodiment of the present disclosure, the electronic device 42 receives the call data corresponding to the call event and plays the call data. The electronic device may receive the call data corresponding to the call event and plays the audio content in the call data. Specifically, the electronic device may play the call data of an incoming calling party, the call data of in outgoing called party, the audio call data of a calling part of a voice/video call, and the audio data in a voice/video message, etc.

In the embodiment of the present disclosure, the electronic device 42, in response to a control instruction from the user, receives the call data corresponding to the call event and plays the call data. Based on the control instruction from the user, the electronic device may determine whether to receive the call data corresponding to the call event and play the audio content in the call data. Specifically, the electronic device may play the call data of an incoming calling party, the call data of an outgoing called party, the audio call data of a calling party of a voice/video call, and the audio call data in a voice/video message, etc.

Embodiment Three

Figure 5:
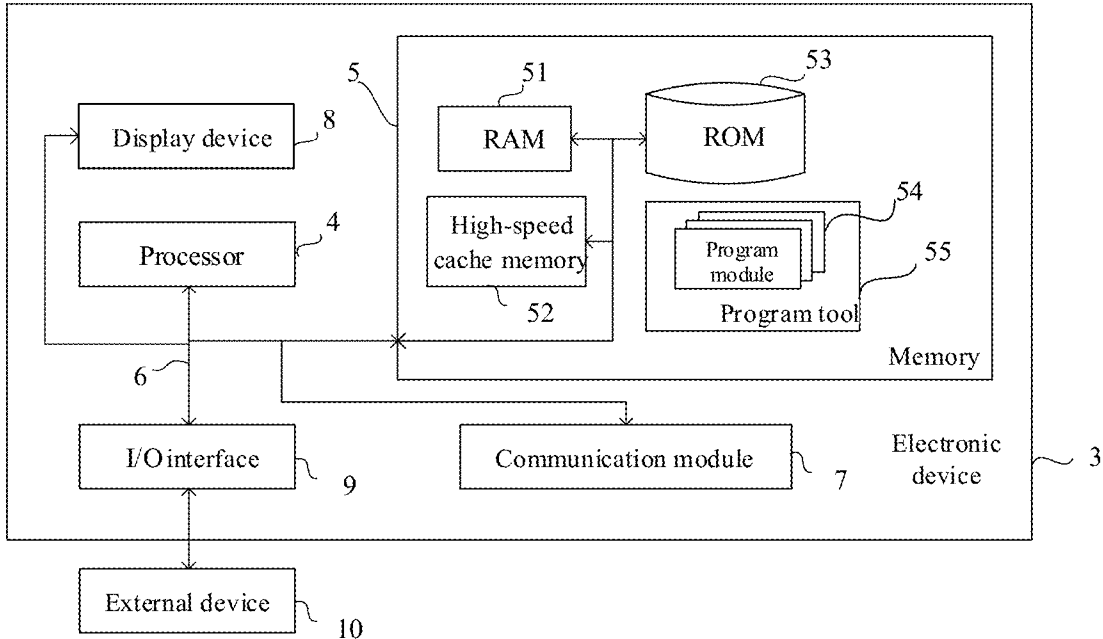
FIG. 5 is a structural block diagram of an exemplary electronic device according to some embodiments of the present disclosure.

FIG. 5 is a structural block diagram of an exemplary electronic device according to some embodiments of the present disclosure. As shown in FIG. 5, the electronic device 3 includes a display device, a communication module configured to communicate with other devices, at least one processor, and a memory coupled with the at least one processor. The memory stores instructions that can be executed by the at least one processor. When the instructions are executed by the at least one processor, the instructions cause the at least one processor to implement the disclosed call control method. The electronic device provided by the present disclosure may be a device such as the vehicle terminal or the smart speaker system. The vehicle terminal may be called the in-vehicle information system, such as the in-vehicle infotainment product installed in the vehicle, capable of the information communication between the user and the vehicle or between the vehicle and the outside world. The electronic device 3 in FIG. 5 is merely an example, and should not limit the functions and scope of use of the embodiments of the present disclosure.

Components of the electronic device 3 may include but are not limited to: at least one processor 4, at least one memory 5, a bus 6 connecting different system components (including the at least one memory 5 and the at least one processor 4), a communication module 7, and a display device 8.

The bus 6 may include a data bus, an address bus, and a control bus.

The at least one memory 5 may include a non-volatile memory, e.g., a random-access memory (RAM) 51 and/or a high-speed cache memory 52, and a read-only memory 53.

The at least one memory 5 may also include a set (at least one) of program modules 54. The set of program modules 54 may include but is not limited to: an operating system, one or more application programs, other program modules, and program data. Each or some combination of the examples may include implementation of a network environment.

The communication module 7 may include an antenna, a mobile communication unit, a wireless communication unit, a modem processor, and a baseband processor, etc. The antenna is configured to transmit and receive electromagnetic wave signals. The mobile communication unit may provide mobile communication solutions including 2G/3G/4G/5G applied to the electronic device. In some embodiments, at least part of a functional module of the mobile communication unit may be configured in the at least one processor 4. In some embodiments, the at least part of the functional module of the mobile communication unit may be configured in a same device as at least part of a module of the at least one processor 4. The wireless communication unit may provide wireless communication solutions including wireless local area networks (WLAN) such as a Wi-Fi network, Bluetooth, global navigation satellite system, frequency modulation (FM) radio, near field communication (NFC), and infrared technology, etc. As shown in FIG. 5, the communication module 7 communicates with other modules/components of the electronic device 3 through the bus 6.

The display device 8 is used to display images and videos. The display device 8 includes a display panel. The display panel may be a liquid crystal display (LCD) panel, an organic light emitting diode (OLED) panel, an active matrix organic light emitting diode (AMOLED) panel, or a quantum dot light emitting diode (QLED) panel, etc. As shown in FIG. 5, the display device 8 communicates with the other modules/components of the electronic device 3 through the bus 6.

The at least one processor 4 executes a computer program stored in the at least one memory 5 to perform various functional applications and data processing, such as the disclosed call control method.

The electronic device 3 may also communicate with one or more external devices 10 (e.g., a keyboard, a pointing device, etc.) The communication may be implemented through the I/O interface 9. Although not shown in FIG. 5, the other hardware and/or software modules may also be used in conjunction with the electronic device 3, including but are not limited to: microcode, device drivers, redundant processors, external disk drive arrays, RAID (disk array) systems, tape drives, and data backup storage systems. It should be noted that although several units/modules or sub-units/sub-modules of the electronic device 3 are mentioned in the above detailed description, such division is merely exemplary and not mandatory. In practice, according to the embodiments of the present disclosure, features and functions of two or more units/modules described above may be implemented in one unit/module. Conversely, the features and functions of one unit/module described above may be further divided to implemented by a plurality of unit/modules.

The present disclosure also provides a vehicle. The vehicle includes the disclosed electronic device.

Embodiment Four

The present disclosure also provides a non-volatile computer-readable storage medium storing computer instructions. The computer instructions may be executed by a computer to implement the disclosed call control method.

The computer-readable storage medium may include but is not limited to: a portable disk drive, a hard disk, a random-access memory, a read-only memory, an erasable programmable read-only memory, an optical storage device, a magnetic storage device, or combinations thereof.

The present disclosure also provides a form of program product, including program codes. When the program product runs on the electronic device, the program codes are used to cause the electronic device to implement the disclosed call control method.

The program codes for implementing the embodiments of the present disclosure may be written in any combination of one or more programming languages. The program codes may completely run on the electronic device, partially run on the electronic device, run as an independent software package, partially run on the electronic device and partially run on a remote device, or entirely run on the remote device.

Although the embodiments of the present disclosure have been disclosed above, the present disclosure is not limited thereto. Any person skilled in the art can make various changes and modifications without departing from the spirit and scope of the present disclosure, so the protection scope of the present invention should be based on the scope defined in the claims.

What is claimed is:

1. A call control method, comprising:

establishing a Bluetooth connection with a mobile terminal;

obtaining call information of the mobile terminal;

determining whether a number corresponding to a call event is an empty number or a number of the mobile terminal, the call event being an event corresponding to the call information;

in response to the number corresponding to the call event being neither an empty number nor the number of the mobile terminal, determining that the call event is a phone call event, and in response to the number corresponding to the call event being either an empty number or the number of the mobile terminal, determining that the call event is not a phone call event; and loading a call interface only when it is determined that the call event is a phone call event.

2. The call control method according to claim 1, wherein loading the call interface only when it is determined that the call event is a phone call event further comprises:

in response to the call event not being a phone call event, intercepting the call event.

3. The call control method according to claim 1, wherein loading the call interface only when it is determined that the call event is a phone call event further comprises:

in response to the call event being a phone call event, transmitting the call event to an upper-level application program and loading the call interface corresponding to the call event.

4. The call control method according to claim 1, wherein after obtaining the call information of the mobile terminal, the method further comprises:

receiving call data corresponding to the call event; and playing the call data.

5. The call control method according to claim 1, wherein after loading the call interface only when it is determined that the call event is a phone call event, the method further comprises:

in response to a control instruction from a user, receiving the call data corresponding to the call event; and playing the call data.

6. The call control method according to claim 1, wherein:

the call event includes a phone call event, a voice call event of an instant messaging application program, a video call event of an instant messaging application program, an audio playback event of an instant messaging application program, or a video playback event of an instant messaging application program.

7. The call control method according to claim 1, wherein:

the mobile terminal is a mobile phone, a wearable device, a personal data assistant, (PDA), or a tablet computer.

8. The call control method according to claim 1, wherein:

the electronic device is a vehicle terminal, a smart speaker system, an in-vehicle information system, or an in-vehicle infotainment product installed in the vehicle.

9. The call control method according to claim 1, wherein: the number of the mobile terminal is a phone number associated with a subscriber identity module (SIM) installed in the mobile terminal.

10. An electronic device, comprising:

a memory storing computer instructions; and a processor coupled to the memory;

wherein when being executed by the processor, the computer instructions cause the processor to:

establish a Bluetooth connection with a mobile terminal;

obtain call information of the mobile terminal;

determine whether a number corresponding to a call event is an empty number or a number of the mobile terminal, the call event being an event corresponding to the call information;

in response to the number corresponding to the call event being neither an empty number nor the number of the mobile terminal, determine that the call event is a phone call event, and in response to the number corresponding to the call event being either an empty number or the number of the mobile terminal, determine that the call event is not a phone call event; and load a call interface only when it is determined that the call event is a phone call event.

11. The electronic device according to claim 10, wherein when loading the call interface only when it is determined that the call event is a phone call event, the processor is further configured to:

in response to the call event not being a phone call event, intercept the call event.

12. The electronic device according to claim 10, wherein when loading the call interface only when it is determined that the call event is a phone call event, the processor is further configured to:

in response to the call event being a phone call event, transmit the call event to an upper-level application program and load the call interface corresponding to the call event.

13. The electronic device according to claim 10, wherein after obtaining the call information of the mobile terminal, the processor is further f configured to:

receive call data corresponding to the call event; and play the call data.

14. The electronic device according to claim 10, wherein after loading the call interface only when it is determined that the call event is a phone call event, the processor is further configured to:

in response to a control instruction from a user, receive the call data corresponding to the call event; and play the call data.

15. The electronic device according to claim 10, wherein:

the call event includes a phone call event, a voice call event of an instant messaging application program, a video call event of an instant messaging application program, an audio playback event of an instant messaging application program, or a video playback event of an instant messaging application program.

16. The electronic device according to claim 10, wherein:

the mobile terminal is a mobile phone, a wearable device, a personal data assistant, (PDA), or a tablet computer.

17. The electronic device according to claim 10, wherein:

the number of the mobile terminal is a phone number associated with a subscriber identity module (SIM) installed in the mobile terminal.

18. The electronic device according to claim 10, further comprising:

a communication module configured to establish Bluetooth connection with the mobile terminal; and a display device configured to load the call interface.

19. A non-transitory computer-readable storage medium storing computer instructions, wherein when being executed by a processor, the computer instructions cause the processor to perform:

establishing a Bluetooth connection with a mobile terminal;

obtaining call information of the mobile terminal;

determining whether a number corresponding to a call event is an empty number or a number of the mobile terminal, the call event being an event corresponding to the call information;

in response to the number corresponding to the call event being neither an empty number nor the number of the mobile terminal, determining that the call event is a phone call event, and in response to the number corresponding to the call event being either an empty number or the number of the mobile terminal, determining that the call event is not a phone call event; and loading a call interface only when it is determined that the call event is a phone call event.

20. The non-transitory computer-readable storage medium according to claim 19, wherein when loading the call interface only when it is determined that the call event is a phone call event, the computer instructions further cause the processor to perform:

in response to the call event not being a phone call event, intercepting the call event.

* * * * *